(12) United States Patent
Lee et al.

(10) Patent No.: US 9,892,483 B2
(45) Date of Patent: Feb. 13, 2018

(54) TIMING CONTROLLER, DISPLAY SYSTEM INCLUDING THE SAME, AND METHOD OF USE THEREOF

(71) Applicant: Samsung Electronics Co., Ltd., Suwon-si, Gyeonggi-do (KR)

(72) Inventors: Jae Chul Lee, Seongnam-si (KR); Jong Seon Kim, Seongnam-si (KR); Yun Hee Kang, Incheon (KR); Hyun Je Park, Seoul (KR); Myung Seok Oh, Hwaseong-si (KR); Se Moon Oh, Suwon-si (KR)

(73) Assignee: SAMSUNG ELECTRONICS CO., LTD., Yeongtong gu, Suwon-si, Gyeonggi-do (KR)

( * ) Notice: Subject to any disclaimer, the term of this patent is extended or adjusted under 35 U.S.C. 154(b) by 492 days.

(21) Appl. No.: 14/532,411

(22) Filed: Nov. 4, 2014

(65) Prior Publication Data

US 2015/0130822 A1 May 14, 2015

(30) Foreign Application Priority Data

Nov. 13, 2013 (KR) .......................... 10-2013-0137345

(51) Int. Cl.
| | |
|---|---|
| G06F 1/32 | (2006.01) |
| G06T 1/60 | (2006.01) |
| G09G 3/20 | (2006.01) |
| G09G 5/00 | (2006.01) |
| G06F 1/26 | (2006.01) |

(52) U.S. Cl.
CPC ................. *G06T 1/60* (2013.01); *G09G 3/20* (2013.01); *G09G 5/006* (2013.01); *G06F 1/26* (2013.01); *G09G 2330/021* (2013.01); *G09G 2330/12* (2013.01); *G09G 2360/18* (2013.01); *G09G 2370/045* (2013.01); *G09G 2370/08* (2013.01); *G09G 2370/10* (2013.01); *G09G 2370/14* (2013.01)

(58) Field of Classification Search
CPC ................................ G06F 3/1407; G06T 1/60
USPC ........................................................ 713/300
See application file for complete search history.

(56) References Cited

U.S. PATENT DOCUMENTS

| | | | | |
|---|---|---|---|---|
| 4,594,709 A | * | 6/1986 | Yasue .................... | H04B 1/745 370/224 |
| 5,559,966 A | * | 9/1996 | Cho ................. | H03K 19/09429 323/222 |

(Continued)

OTHER PUBLICATIONS

MIPI Alliance Standard for Display Serial Interface V1.0; MIPI Board approved Apr. 5, 2006.

(Continued)

*Primary Examiner* — Jaweed A Abbaszadeh
*Assistant Examiner* — Volvick Derose
(74) *Attorney, Agent, or Firm* — Muir Patent Law, PLLC

(57) ABSTRACT

A timing controller capable of communicating with a host via a Mobile Industry Processor Interface (MIPI) interface and communicating with a display via a display interface, includes a detection circuit that detects whether at least one of the MIPI interface and the timing controller is operating normally, and generates a detection signal, and an interrupt generation circuit that transmits the detection signal as an interrupt to the host via an exclusive line.

20 Claims, 11 Drawing Sheets

(56) References Cited

U.S. PATENT DOCUMENTS

| | | | |
|---|---|---|---|
| 5,631,952 A * | 5/1997 | O'Barr | G06F 1/3209 375/222 |
| 7,362,739 B2 | 4/2008 | Cherukuri et al. | |
| 7,876,313 B2 | 1/2011 | Selwan et al. | |
| 8,099,648 B2 | 1/2012 | Schmidt et al. | |
| 8,207,759 B2 | 6/2012 | Boomer et al. | |
| 8,463,333 B2 | 6/2013 | Stuivenwold | |
| 8,640,008 B2 | 1/2014 | Schon et al. | |
| 2003/0196130 A1 * | 10/2003 | Pastorello | G06F 13/4291 713/400 |
| 2004/0081079 A1 * | 4/2004 | Forest | H04L 12/417 370/216 |
| 2006/0187001 A1 * | 8/2006 | Pessolano | G01R 31/31725 340/309.16 |
| 2007/0165710 A1 * | 7/2007 | Alameh | H04L 25/0286 375/220 |
| 2008/0307140 A1 * | 12/2008 | Goldstein | G06F 13/24 710/260 |
| 2012/0166696 A1 * | 6/2012 | Kallio | H04M 1/67 710/260 |
| 2012/0287140 A1 | 11/2012 | Lin et al. | |
| 2012/0294401 A1 | 11/2012 | Lin et al. | |
| 2013/0033510 A1 * | 2/2013 | Dou | G06F 3/1415 345/531 |
| 2013/0100121 A1 | 4/2013 | Cha | |
| 2013/0106502 A1 * | 5/2013 | Dohm | G06F 1/3206 327/544 |
| 2013/0110447 A1 | 5/2013 | Gettemy et al. | |
| 2013/0120037 A1 * | 5/2013 | Tripathi | G06F 1/08 327/156 |
| 2013/0179748 A1 | 7/2013 | Dong et al. | |
| 2013/0235014 A1 * | 9/2013 | Lee | G06F 1/32 345/211 |
| 2013/0246675 A1 * | 9/2013 | Korpinen | G06F 13/42 710/110 |
| 2013/0311799 A1 * | 11/2013 | Fitzpatrick | G06F 1/3296 713/320 |
| 2014/0022234 A1 * | 1/2014 | Ogawa | G06F 1/3265 345/213 |
| 2014/0118330 A1 * | 5/2014 | Lee | G09G 3/2096 345/212 |
| 2014/0126566 A1 * | 5/2014 | Chen | H04W 56/00 370/350 |
| 2014/0136741 A1 * | 5/2014 | Tu | H04L 29/14 710/110 |
| 2014/0306969 A1 * | 10/2014 | Tang | G09G 5/006 345/520 |
| 2014/0368490 A1 * | 12/2014 | Yokonuma | G09G 3/3611 345/212 |

OTHER PUBLICATIONS

EE Times; Connecting the Global Electronics Community; The design of LVDS interface for a Multi-Channel A/D Converter; John X. Wu, Sr. Application Engineer, Texas Instruments.

Texas Instruments; Display Subsystem; Chapter 7, Sprugn4L-May 2010-Revised Jun. 2011.

MIPI D-Phy Reference Termination Board (RTB) Overview and Datasheet.

* cited by examiner

TIMING CONTROLLER, DISPLAY SYSTEM INCLUDING THE SAME, AND METHOD OF USE THEREOF

CROSS-REFERENCE TO RELATED APPLICATIONS

This application claims the benefit of priority under 35 U.S.C. §119(a) from Korean Patent Application No. 10-2013-0137345 filed on Nov. 13, 2013, the disclosure of which is hereby incorporated by reference in its entirety.

BACKGROUND

1. Field

Example embodiments relate to a timing controller, and more particularly, to a timing controller using a Mobile Industry Processor Interface (MIPI®) interface and a display system including the timing controller.

2. Description of the Related Art

An MIPI Display Serial Interface (DSI) is a display standard for portable electronic devices. The MIPI supports two display standards, namely, a video mode and a command mode.

In the video mode, frame data is transmitted from a host to a display driver integrated circuit (IC) in real time. In the video mode, even when an image to be transmitted to the display driver IC is a still image, the host continuously transmits the still image to the display driver IC. Thus, power consumption of the host increases.

In the command mode, a transmission start of frame data is controlled by a tearing effect (TE) signal. When a still image is desired to be displayed on a display, the display driver IC periodically reads the still image stored in a frame buffer embedded in the display driver IC, and transmits the read-out still image to the display. This operation is referred to as a panel self-refresh (PSR).

SUMMARY

Features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a timing controller capable of communicating with a host via a Mobile Industry Processor Interface (MIPI) interface and communicating with a display via a display interface, the timing controller including a detection circuit that detects whether at least one of the MIPI interface and the timing controller is operating normally, and generates a detection signal, and an interrupt generation circuit that transmits the detection signal as an interrupt to the host via an exclusive line.

The timing controller may further include a clock lane module. The detection circuit may detect a transition of an operation mode of the timing controller from a low power (LP) mode to a high speed (HS) mode based on an output signal of the clock lane module, and output the detection signal. The clock lane module may maintain the HS mode in response to the detection signal even when the output signal of the clock lane module is changed by external noise in the HS mode.

The timing controller may further include a data lane module including a finite state machine (FSM) capable of controlling a communication direction. The detection circuit may detect a change of a direction indication signal output by the data lane module, and may generate the detection signal according to a result of the detection. The FSM may be initialized so that the data lane module may operate in a reception mode in response to the detection signal.

The timing controller may further include a reception interface that transforms MIPI data received via the MIPI interface from the host into display data. The detection circuit may generate the detection signal when frame information included in the display data output by the reception interface is not received within a predetermined period of time.

The timing controller may further include a reception interface that transforms the MIPI data received via the MIPI interface from the host into display data. The detection circuit may generate the detection signal when a size of a payload included in the display data output by the reception interface is different from that of a reference payload.

The timing controller may further include a frame memory that stores data, and a cyclic redundancy check (CRC) circuit that generates an error detection signal based on a CRC with respect to the data. The interrupt generation circuit may generate the interrupt based on the error detection signal.

The timing controller may further include a register bank that stores a parameter used for an operation of the timing controller, and a checksum circuit that sets a first checksum for an updated parameter into a reference checksum when the parameter as stored is updated into the updated parameter by the host and a first checksum for the updated parameter is different from a second checksum for the parameter as stored.

The timing controller may further include a register bank that stores a parameter used for an operation of the timing controller, and a checksum circuit that outputs an error detection signal when the parameter as stored is not updated by the host and a first checksum for the parameter as stored is different from a second checksum that is previously calculated for the parameter as stored. The interrupt generation circuit may generate the interrupt based on the error detection signal.

The parameter as stored may be at least one of frame rate information, resolution information, or setting information of a clock generator implemented in the timing controller.

The timing controller may further include a processing circuit that receives an event signal from the display while transmitting (N+1)th line data to the display via the display interface, and a line memory that re-transmits N-th line data to the display via the display interface under the control of the processing circuit.

The display may include a clock generator that generates a display clock, and a detector that detects a loss of a lock state of the clock generator and generates the event signal according to a result of the detection.

The present general inventive concept may also be achieved by providing a display system including a host, a timing controller that communicates with the host via an MIPI interface, and a display that communicates with the timing controller via a display interface. The timing controller may include a detection circuit that detects whether at least one of the MIPI interface and the timing controller is operating normally, and generates a detection signal, and an interrupt generation circuit that transmits the detection signal as an interrupt to the host via an exclusive line.

The present general inventive concept may also be achieved by providing a method of operating a display system including a timing controller in communication with a host via a MIPI interface and in communication with a display via a display interface, including monitoring a plurality of operating conditions among at least one of the timing controller, the display and the MIPI interface, transmitting feedback from the timing controller to the host when an abnormal operating condition is detected via the monitoring of any of the timing controller, the display or the MIPI interface, and controlling an operation of the display system in response to the feedback from the timing controller.

The abnormal operating condition may be detected by detecting an abnormal increase in an output signal of a clock lane module of the MIPI interface while the display system is operating in a high speed (HS) mode, and the display system may be operated to be maintained in the HS mode in response to the feedback from the timing controller.

The abnormal operating condition may be detected by detecting a change in a direction indication signal output by a data lane module of the MIPI interface, and a finite state machine (FSM) configured to control the direction of the indication signal may be initialized in response to the feedback from the timing controller.

The abnormal operating condition may be detected by analyzing data output from a transmission interface of the MIPI interface, and determining whether frame information in the data is received within a predetermined period of time.

The abnormal operating condition may be detected by analyzing data output from a transmission interface of the MIPI interface and determining whether a size of a payload included in the data is different from a size of a reference payload.

The abnormal operation condition may be detected by performing a cyclic redundancy check (CRC) on data received from the host and determining, via the CRC, whether the data has been changed by external noise.

The present general inventive concept may also be achieved by providing a timing controller, in communication with a host via a Mobile Industry Processor Interface (MIPI) interface and in communication with a display via a display interface, including a reception interface to receive a clock signal and one or more data signals from the host, a first detection circuit to generate a first detection signal based on a change in the clock signal or a change of direction of the one or more data signals, and an interrupt generation circuit to transmit an interrupt signal to the host based on the first detection signal.

The timing controller may further comprise a second detection circuit to analyze data received via the one or more data signals and to generate a second detection signal based on whether frame information included in the data is received within a predetermined period of time and whether a size of a payload of the data is different from a size of a reference payload. The interrupt generation circuit may further transmit an interrupt signal to the host based on the second detection signal.

The timing controller may further comprise a cyclic redundancy check (CRC) circuit to generate a third detection signal based on a CRC performed on data received from the host. The interrupt generation circuit may further transmit an interrupt signal to the host based on the third detection signal.

The timing controller may further comprise a register bank that stores a parameter used for an operation of the timing controller, and a checksum circuit to scan the parameter and to generate a fourth detection signal based on a comparison of a first checksum calculated with the parameter against a second checksum previously calculated with the parameter. The interrupt generation circuit may further transmit an interrupt signal to the host based on the fourth detection signal.

BRIEF DESCRIPTION OF THE DRAWINGS

These and/or other features and utilities of the present general inventive concept will become apparent and more readily appreciated from the following description of the embodiments, taken in conjunction with the accompanying drawings of which.

DETAILED DESCRIPTION OF THE EMBODIMENTS

Figure 1:
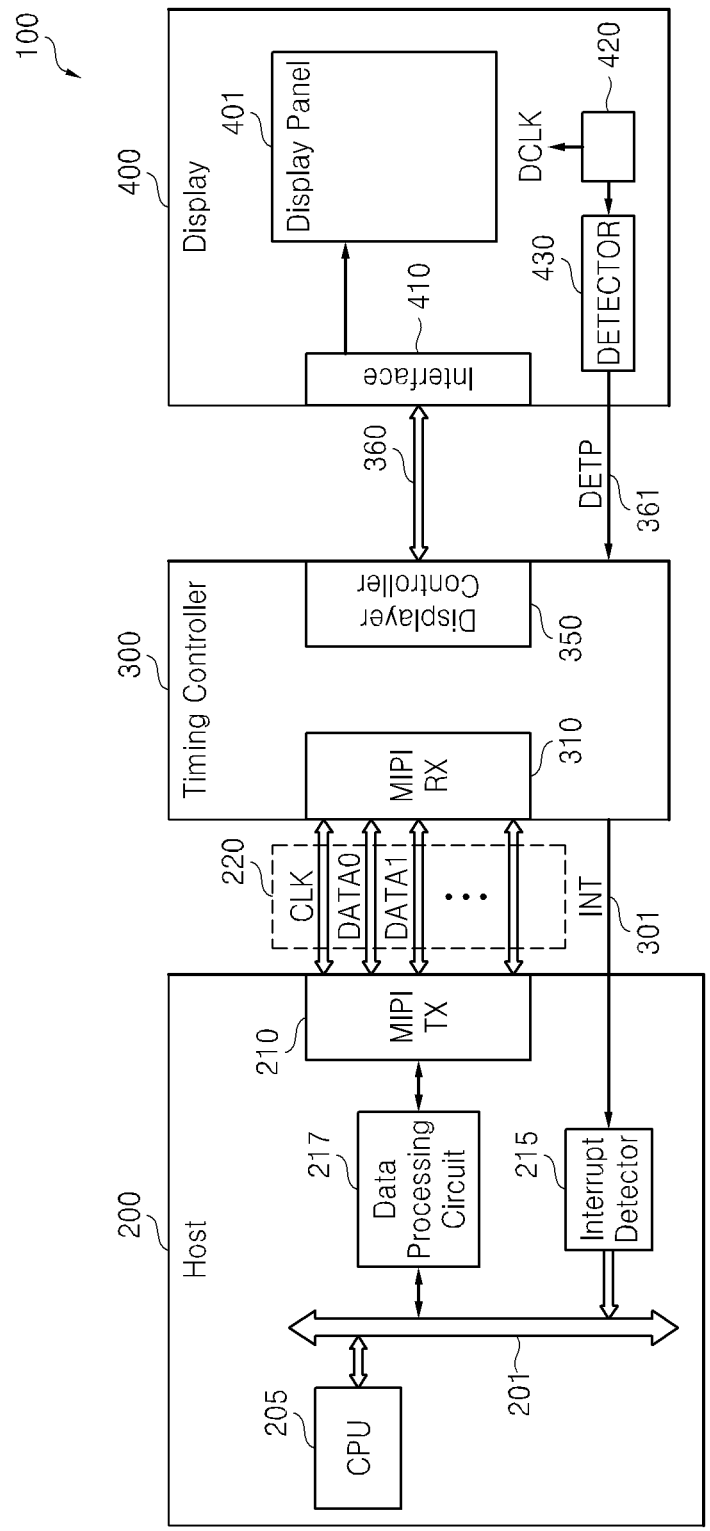
FIG. 1 is a block diagram illustrating a display system according to an exemplary embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

This general inventive concept may, however, be embodied in many different forms and should not be construed as limited to the embodiments set forth herein. Rather, these embodiments are provided so that this disclosure will be thorough and complete, and will fully convey the scope of the general inventive concept to those skilled in the art. In the drawings, the size and relative sizes of layers and regions may be exaggerated for clarity.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the present general inventive concept.

The terminology used herein is for the purpose of describing particular embodiments only and is not intended to be limiting of the general inventive concept. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this general inventive concept belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein The matters defined in the description, such as detailed construction and elements, are provided to assist in a comprehensive understanding of the exemplary embodiments. Thus, it is apparent that the exemplary embodiments can be carried out without those specifically defined matters. Also, functions or elements known in the related art are not described in detail since they would obscure the exemplary embodiments with unnecessary detail.

FIG. 1 is a block diagram of a display system 100 according to an embodiment of the present general inventive concept. Referring to FIG. 1, the display system 100 includes a host 200, a timing controller 300, and a display 400. The display system 100 may be implemented by using a device capable of using a Mobile Industry Processor Interface (MIPI®) or a MIPI protocol.

The device may be, for example, a mobile device such as a mobile phone, a smart phone, a tablet personal computer (PC), a personal digital assistant (PDA), an enterprise digital assistant (EDA), a digital still camera, a digital video camera, a portable multimedia player (PMP), a personal navigation device or a portable navigation device (PND), a mobile internet device (MID), a wearable computer, a household appliance computer, or the like.

The host 200 may control an operation of the timing controller 300. The host 200 and the timing controller 300 may communicate with each other via a MIPI interface 220. For example, the host 200 may be implemented by using an integrated circuit (IC), a system-on-chip (SoC), an application processor (AP), or a mobile AP.

In this specification, an MIPI or an MIPI protocol is described as an embodiment for convenience of explanation, but the technical spirit of the present general inventive concept (namely, the technique in which information about whether an interface connected between a host and a timing controller is normal and/or information about whether the timing controller is normal are transmitted to the host) may be applied to display systems including interfaces other than an MIPI and an MIPI protocol.

The host 200 includes a central processing unit (CPU) 205, a MIPI master side transmission interface 210 (hereinafter, referred to as an MIPI TX 210), an interrupt detector 215, and a data processing circuit 217. The CPU 205 may control the MIPI TX 210, the interrupt detector 215, and/or the data processing circuit 217 via a bus 201. The CPU 205 may include one or more cores.

Figure 3:
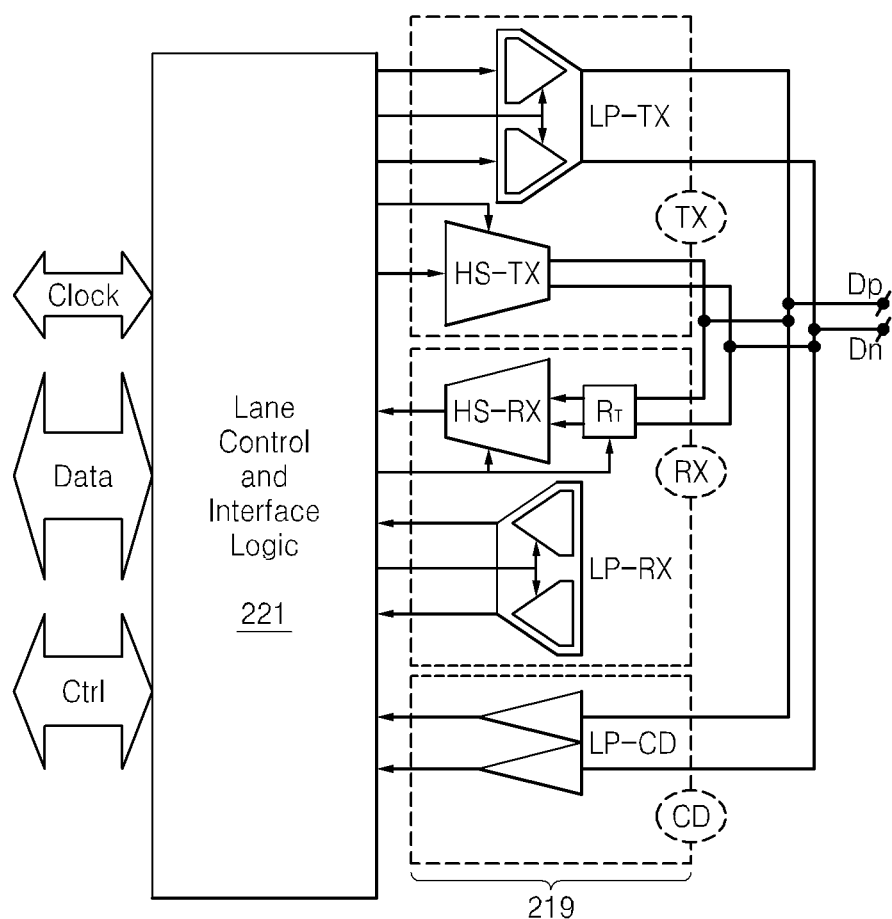
FIG. 3 is a diagram illustrating universal lane module functions of a Mobile Industry Processor Interface (MIPI)

The MIPI TX 210 includes one clock lane module and one or more data lane modules. The clock lane module and one or more data lane modules may each be implemented, for example, as interconnections or circuits within a DSI physical layer (D-PHY) transceiver 219, as illustrated in FIG. 3. Each lane module may respectively include interconnections or circuits which function as a high-speed transmitter (HS-TX), a high-speed receiver (HS-RX), a low-power transmitter (LP-TX), a low-power receiver (LP-RX), and a low-power contention detector (LP-CD).

Referring to FIG. 3, a transmitter TX may include the LP-TX and the HS-TX, a receiver RX may include the HS-RX, the LP-RX, and a termination resistor (or a termination impedance) RT, and a connection detector CD may include the LP-CD. The termination resistor RT may be enabled when each lane module is in an HS reception mode.

A D-PHY transceiver 219 as illustrated in FIG. 3 may be controlled by a lane control and interface logic 221. In this present specification, a specification provided by the MIPI Alliance may be referred to as would be understood by one of ordinary skill in the art. Thus, a detailed explanation of the D-PHY transceiver 219 and lane control and interface logic 221 is omitted.

Referring back to FIG. 1, the interrupt detector 215 may receive an interrupt (or interrupt signal) INT from the timing controller 300 via an exclusive (or dedicated) line 301 and may transmit a signal corresponding to the interrupt INT to the CPU 205 and/or the MIPI TX 210.

The CPU 205 may interpret (or analyze) the signal corresponding to the interrupt INT, determine a state of the MIPI interface 220 and/or that of the timing controller 300 according to a result of the interpretation (or analyzing), and control an operation of the MIPI TX 210 and/or that of the data processing circuit 217 according to a result of the determination.

The data processing circuit 217 may denote a function circuit capable of processing data (for example, still image data, moving image data, and/or a parameter) that is to be transmitted to the timing controller 300 via the MIPI TX 210.

The MIPI interface 220 connected between the host 200 and the timing controller 300 includes one clock lane and one or more data lanes.

The clock lane transmits, to the timing controller 300, a MIPI clock signal CLK that has different frequencies and different swing levels according to operation modes (for example, a low power (LP) mode and a high speed (HS) mode). Each data lane transmits, to the timing controller 300, MIPI data signals DATA0, DATA1, . . . and the like that have different frequencies and different swing levels according to the operation modes.

The timing controller 300 includes a MIPI slave side reception interface 310 (hereinafter, referred to as a MIPI RX 310) and a display controller 350. A structure and an operation of the timing controller 300 will be described in detail with reference to FIG. 2.

The MIPI RX 310 includes one clock lane module and one or more data lane modules. As illustrated in FIG. 3, each lane module may be implemented using one or more D-PHY transceivers 219 and may include the HS-TX, the HS-RX, the LP-TX, the LP-RX, and the LP-CD.

Referring back to FIG. 1, the timing controller 300 transmits display data to the display 400 via a display interface 360. The timing controller 300 may be implemented by using a chip, an IC, a processor or the like. The display interface 360 may be implemented, for example, by using an enhanced reduced voltage differential signal transmission (eRVDS) interface for convenience of explanation, but the present general inventive concept is not limited thereto.

The timing controller 300 may re-transmit line data previous to current line data that is being transmitted, to the display 400 in response to an activated event signal (DETP) received from the display 400 via an exclusive (or dedicated) line 361.

The display 400 includes a display panel 401, a reception interface 410, a clock generator 420, and a detector 430. The display panel 401 may display an image corresponding to the display data that is received via the reception interface 410. The reception interface 410 may transform the display data into a form suitable for the display panel 401.

The clock generator 420 provides a display clock signal DCLK to a processing circuit (not illustrated) capable of processing the display data. For example, the clock generator 420 may be implemented by using a phase-locked loop (PLL) or a delay-locked loop (DLL).

The detector 430 may monitor whether the clock generator 420 maintains a lock state, and may generate the activated event signal DETP when the clock generator 420 loses the lock state. For example, when the clock generator 420 is affected by external noise, the clock generator 420 may lose the lock state. The external noise may be transient noise, for example, like an electrostatic discharge (ESD).

Figure 2:
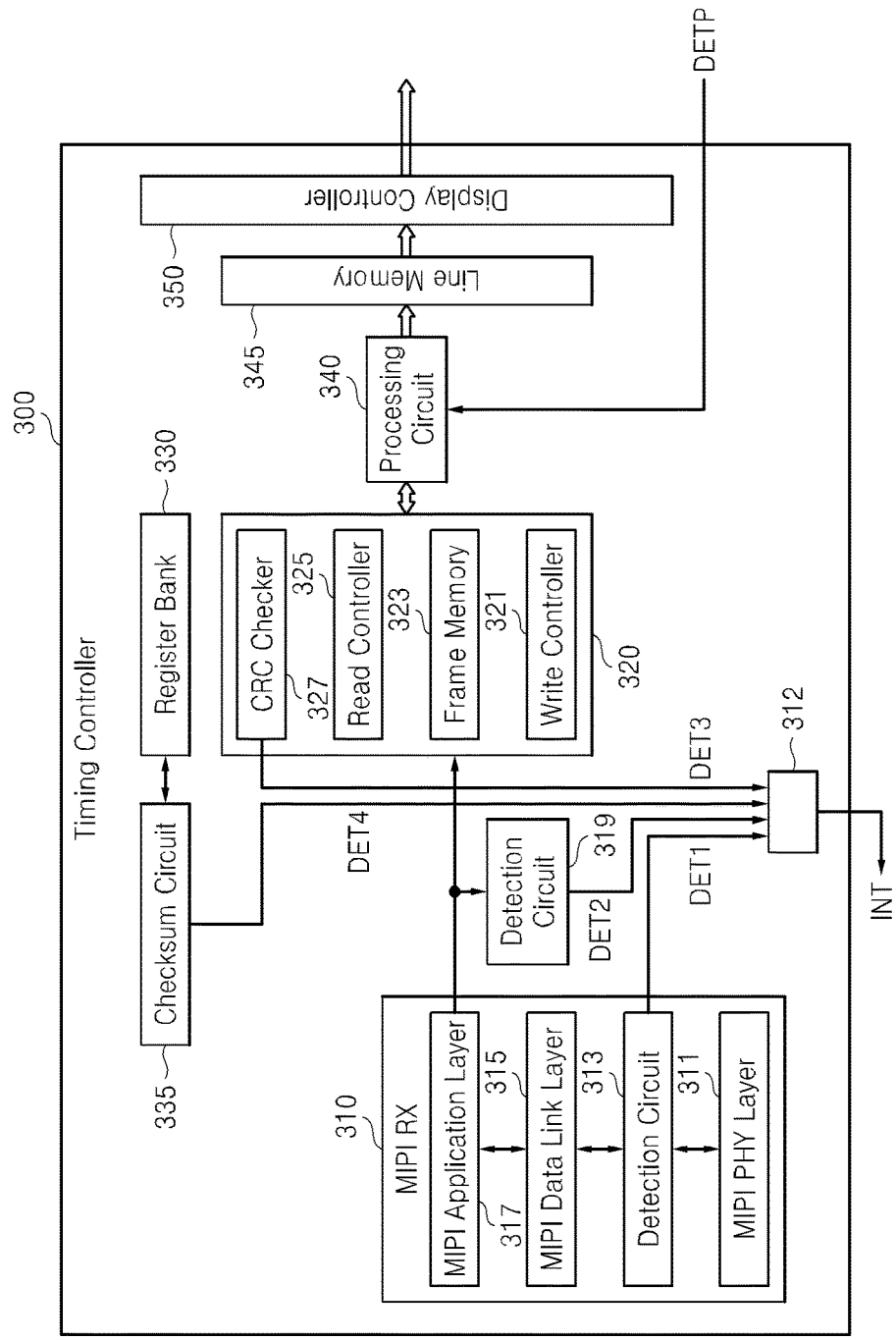
FIG. 2 is a block diagram illustrating a timing controller included in the display system illustrated in FIG. 1 according to an exemplary embodiment of the present general inventive concept.

FIG. 2 is a detailed block diagram of the timing controller 300 illustrated in FIG. 1. Referring to FIGS. 1 and 2, the timing controller 300 includes the MIPI RX 310, an interrupt generation circuit 312, a second detection circuit 319, a data processing circuit 320, a register bank 330, a checksum circuit 335, a processing circuit 340, a line memory 345, and the display controller 350.

The timing controller 300 may be implemented by using, for example, an integrated circuit (IC) or a semiconductor chip. The MIPI RX 310 may receive the MIPI clock signal CLK and the MIPI data DATA0, DATA1, . . . and the like from the host 200 via the MIPI interface 220.

The MIPI RX 310 may transmit MIPI data received via the MIPI interface 220 in a video stream. The MIPI RX 310 includes a MIPI PHY layer 311, a first detection circuit 313, a MIPI data link layer 315, and a MIPI application layer 317.

Since a structure and a function of each of the MIPI PHY layer 311, the MIPI data link layer 315, and the MIPI application layer 317 except for the first detection circuit 313 are substantially the same as those of each of corresponding layers defined in the MIPI specification, a detailed description thereof will be omitted.

The first detection circuit 313 may detect normality or abnormality of the MIPI interface 220 and/or normality or abnormality of the timing controller 300, may generate a first detection signal DET1 according to a result of the detection, and may transmit the first detection signal DET1 to the MIPI PHY layer 311 and/or the interrupt generation circuit 312. The normality or abnormality of the MIPI interface 220 and/or the normality or abnormality of the timing controller 300 may be determined, for example, according to external noise.

According to exemplary embodiments of the present general inventive concept, the first detection circuit 313 may be implemented in the same layer as the MIPI PHY layer 311, in the same layer as the MIPI data link layer 315, or between the MIPI PHY layer 311 and the MIPI data link layer 315.

Figure 4:
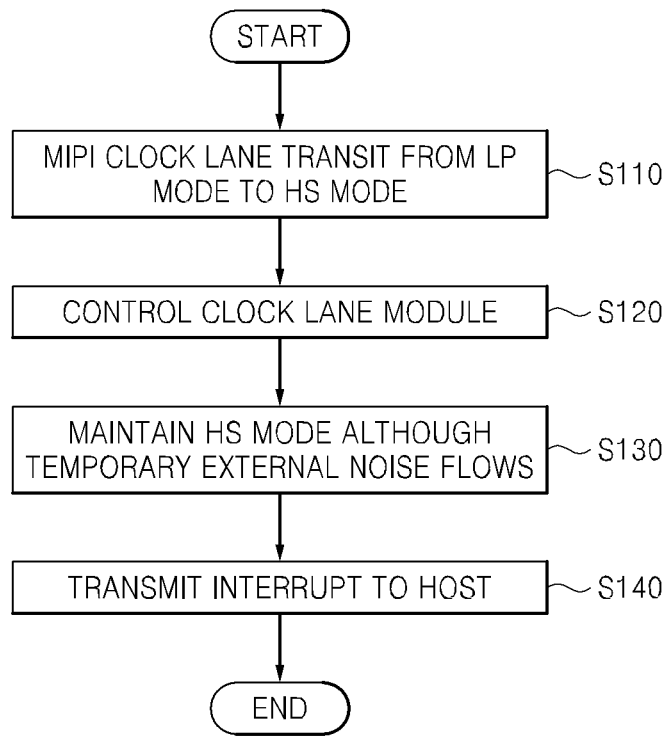
FIG. 4 is a flowchart illustrating a method of reinforcing a system level reliability of an MIPI interface included in the display system illustrated in FIG. 1, according to an exemplary embodiment of the present general inventive concept.

FIG. 4 illustrates a flowchart of a method of reinforcing a system level reliability of the MIPI interface 220 in the display system 100 illustrated in FIG. 1, according to an exemplary embodiment of the present general inventive concept.

Referring to FIGS. 1-4, when an operation mode of the timing controller 300 transits from an LP mode to an HS mode based on the MIPI clock signal CLK received via the clock lane of the MIPI interface 220 in operation S110, the first detection circuit 313 detects the transition and controls the termination resistor RT of the HS-RX and a finite state machine (FSM) (not illustrated) which are implemented in the clock lane module of the MIPI PHY layer 311 of the MIPI RX 310 according to a result of the detection. According to the control, the MIPI RX 310 of the timing controller 300 may operate in the HS mode, in operation S120.

As the termination resistor RT of the HS-RX and the FSM are controlled, although temporary external noise (for example, ESD) flows into the MIPI interface 220 and thereafter the MIPI HS clock signal CLK is suddenly changed, the MIPI RX 310 may operate in the HS mode, in operation S130. In general, when the level of a MIPI HS clock signal received via the MIPI interface 220 suddenly increases by external noise, the timing controller 300 usually transits from an HS mode to an LP mode.

However, according to an exemplary embodiment of the present general inventive concept, when the operation mode of the timing controller 300 transits from the LP mode to the HS mode, the first detection circuit 313 controls the clock lane module implemented in the MIPI PHY layer 311 so that the MIPI RX 310 may maintain the HS mode. Thus, although a level of the MIPI HS clock signal CLK received via the MIPI interface 220 suddenly increases by the external noise, the HS-RX implemented in the clock lane module may maintain an enable state, and the LP-RX may maintain a disable state, in operation S130.

The first detection circuit 313 detects that an output signal of the clock lane module of the MIPI PHY layer 311 suddenly abnormally increases and transmits the first detection signal DET1 activated according to a result of the detection to the interrupt generation circuit 312. Herein, the abnormal increase of the output signal of the clock lane module excludes a normal transition from the HS mode to the LP mode.

The interrupt generation circuit 312 transmits the interrupt INT to the interrupt detector 215 of the host 200 via the exclusive line 301, in operation S140. The interrupt detector 215 transmits the signal corresponding to the interrupt INT to the CPU 205 via the bus 201.

The CPU 205 may interpret the signal received from the interrupt detector 215, and may determine whether the MIPI interface 220 and/or the timing controller 300 are operating normally, according to a result of the interpretation. In other words, the CPU 205 may determine that external noise has flowed into the MIPI interface 220 and/or the timing controller 300, based on the signal.

A conventional host cannot receive feedback from the timing controller 300 regarding a result of the determination as to whether the MIPI interface 220 and/or the timing controller 300 are operating normally. Thus, the conventional host periodically initializes a clock lane or a clock lane module. However, the host 200 according to an embodiment of the present general inventive concept may receive feedback from the timing controller 300 regarding a result of the determination as to whether the MIPI interface 220 and/or the timing controller 300 are operating normally, via the interrupt INT.

Accordingly, the host 200 does not need to periodically initialize the clock lane. Thus, the system level reliability of the MIPI interface 220 increases. The interrupt generation circuit 312 may be implemented by using an OR gate, a multiplexer, or other circuit used to selectively pass on detection signal from the timing controller 300 as an interrupt signal to the host 200.

Figure 5:
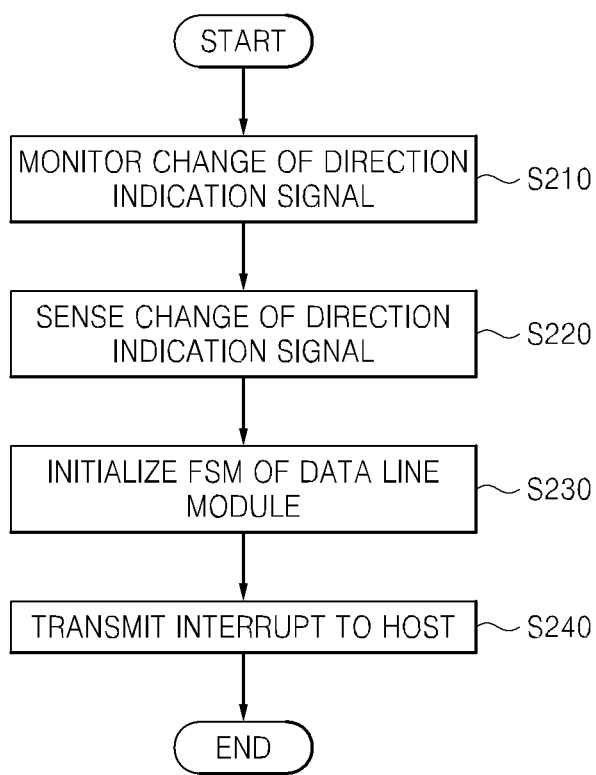
FIG. 5 is a flowchart illustrating a method of reinforcing a system level reliability of the MIPI interface included in the display system illustrated in FIG. 1, according to another exemplary embodiment of the present general inventive concept.

FIG. 5 illustrates a flowchart of a method of reinforcing the system level reliability of the MIPI interface 220 in the display system 100 illustrated in FIG. 1, according to another exemplary embodiment of the present general inventive concept. Referring to FIGS. 1, 2, and 5, a data lane inter-connection module of the MIPI protocol may be defined bi-directionally, as illustrated in FIG. 3.

In general, the data lane module of the MIPI RX 310 of the timing controller 300 operates in a reception mode. In other words, in the LP mode, the low power receiver (LP-RX) is enabled, and the low power transmitter (LP-TX) is disabled. In the HS mode, the high speed receiver (HS-RX) is enabled, and the high speed transmitter (HS-TX) is disabled.

When external noise flows into the MIPI interface 220 and/or the timing controller 300, and thus the data lane module of the MIPI RX 310 is changed from the reception mode to the transmission mode, the MIPI RX 310 cannot receive MIPI data. For example, when the data lane module of the MIPI RX 310 includes an FSM capable of controlling a communication direction, the first detection circuit 313 monitors a change of a direction indication signal that is output by the data lane module, in operation S210.

For example, supposing that, when the data lane module operates in a reception mode, the direction indication signal is in a low level, and when the data lane module operates in a transmission mode, the direction indication signal is in a high level, the direction indication signal is in a low level when the data lane module operates in a normal reception mode.

However, when the level of the direction indication signal abnormally transits from a low level to a high level due to external noise having flowed into the MIPI interface 220 and/or the timing controller 300, the MIPI RX 310 cannot receive the MIPI data, and thus the timing controller 300 malfunctions.

To prevent a malfunction of the timing controller 300, the conventional host periodically initializes a data lane. However, according to an embodiment of the present general inventive concept, the first detection circuit 313 detects a change of the direction indication signal output by the data lane module and generates the first detection signal DET1 activated according to a result of the detection, in operation S220. The first detection circuit 313 transmits the activated detection signal DET1 to the FSM of the data lane module.

In response to the activated first detection signal DET1, the FSM may be initialized so that the data lane module may operate in a reception mode, in operation S230. Although the data lane module is changed from the reception mode to the transmission mode by the external noise, the data lane module may automatically return to the reception mode under the control of the FSM.

Also, the first detection circuit 313 transmits the first detection signal DET1 to the interrupt generation circuit 312.

The interrupt generation circuit 312 transmits the interrupt INT to the interrupt detector 215 of the host 200 via the exclusive line 301, in operation S240. The interrupt detector 215 transmits a signal corresponding to the interrupt INT to the CPU 205 via the bus 201.

The CPU 205 may interpret the signal received from the interrupt detector 215, and may determine that the MIPI interface 220 and/or the timing controller 300 are abnormal, according to a result of the interpretation. In other words, based on the signal, the CPU 205 may determine that external noise has flowed into the MIPI interface 220 and/or the timing controller 300.

The conventional host cannot receive feedback from the timing controller 300 regarding the determination that the MIPI interface 220 and/or the timing controller 300 are abnormal. Thus, the conventional host periodically initializes the data lane or the data lane module.

However, the host 200 according to an embodiment of the inventive concept may receive feedback from the timing controller 300 regarding the determination that the MIPI interface 220 and/or the timing controller 300 are abnormal, via the interrupt INT. Thus, the host 200 does not need to periodically initialize the data lane or the data lane module. Thus, the efficiency and the system level reliability of the MIPI interface 220 and/or the timing controller 300 increases.

Figure 6:
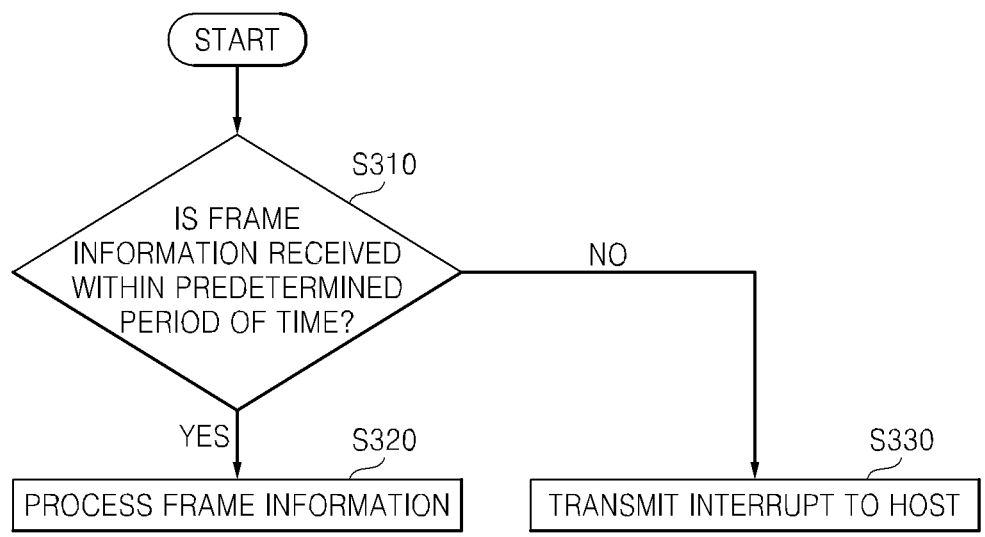
FIG. 6 is a flowchart illustrating a method of reinforcing a system level reliability of the MIPI interface included in the display system illustrated in FIG. 1, according to another exemplary embodiment of the present general inventive concept.

FIG. 6 illustrates a flowchart of a method of reinforcing the system level reliability of the MIPI interface 220 in the display system 100 illustrated in FIG. 1, according to another exemplary embodiment of the present general inventive concept.

The second detection circuit 319 may analyze data (for example, still image data, moving image data, or a video stream) output by the MIPI RX 310, and may generate a second detection signal DET2 according to a result of the analysis. When data transmitted via the MIPI interface 220 transits into a completely unpredictable state, the timing controller 300 cannot perform any operation or any reply.

When frame information (for example, a frame header) included in the data (for example, a video stream) output by the MIPI RX 310 is not received within a predetermined period of time in operation S310, the second detection circuit 319 may generate an activated second detection signal DET2. On the other hand, when the frame information included in the data (for example, a video stream)

output by the MIPI RX 310 is received within the predetermined period of time in operation S310, the frame information may be processed by the data processing circuit 320, in operation S320.

The activated second detection signal DET2 is transmitted to the interrupt generation circuit 312. The interrupt generation circuit 312 transmits an interrupt INT corresponding to the activated second detection signal DET2 to the interrupt detector 215 of the host 200, in operation S330. The interrupt detector 215 transmits the signal corresponding to the interrupt INT to the CPU 205 via the bus 201.

The CPU 205 may interpret the signal received from the interrupt detector 215, and may determine that the MIPI interface 220 and/or the timing controller 300 are abnormal, according to a result of the interpretation. In other words, based on the signal, the CPU 205 may determine that external noise has flowed into the MIPI interface 220 and/or the timing controller 300.

The conventional host cannot receive feedback from the timing controller 300 regarding the determination that the MIPI interface 220 and/or the timing controller 300 are abnormal. However, the host 200 according to an embodiment of the inventive concept can receive feedback from the timing controller 300 regarding the determination that the MIPI interface 220 and/or the timing controller 300 are abnormal, via the interrupt INT. Thus, the host 200 may re-transmit frame information and/or a payload to the timing controller 300 via the MIPI interface 220.

Figure 7:
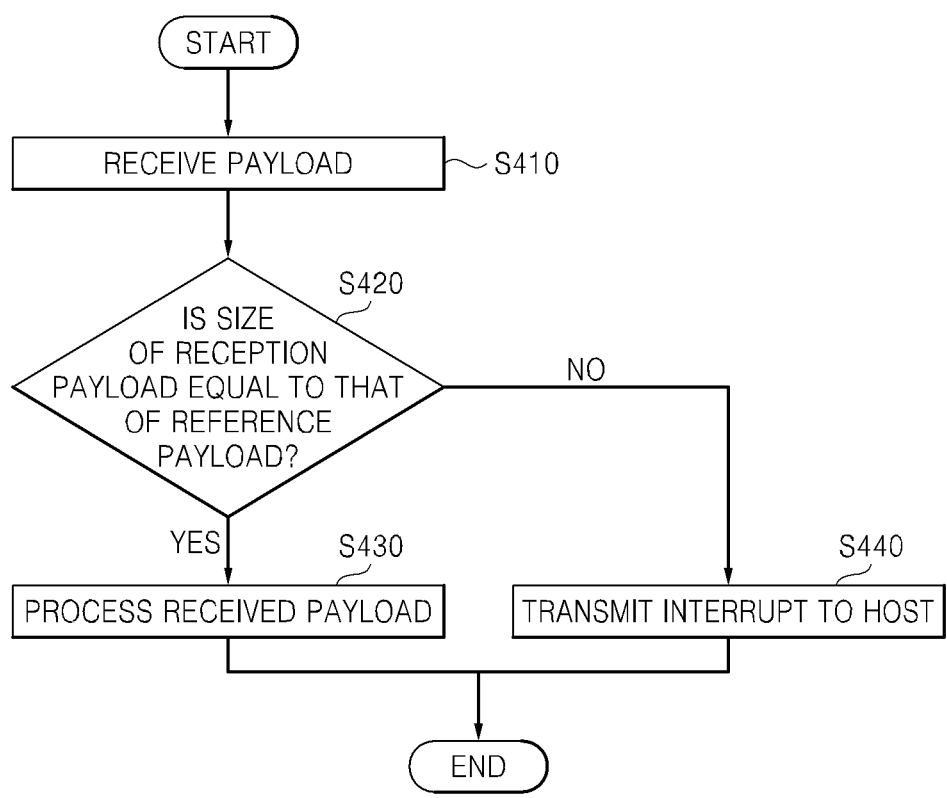
FIG. 7 is a flowchart illustrating a method of reinforcing a system level reliability of the MIPI interface included in the display system illustrated in FIG. 1, according to another exemplary embodiment of the present general inventive concept.

FIG. 7 illustrates a flowchart of a method of reinforcing a system level reliability of the MIPI interface 220 in the display system 100 illustrated in FIG. 1, according to another exemplary embodiment of the present general inventive concept. Referring to FIGS. 1, 2, and 7, the second detection circuit 319 may analyze data (for example, a video stream) output by the MIPI RX 310 and may generate a second detection signal DET2 according to a result of the analysis.

The second detection circuit 319 receives a payload included in data (for example, a video stream) output by the MIPI RX 310 in operation S410, and determines whether a size of the received payload is equal to that of a reference payload, in operation S420. For example, the payload may be located between frame headers.

The size of the reference payload has a predetermined range. For example, the size of the reference payload may depend on the size and sensitivity of an actual payload. The sensitivity may determine an allowable range of the size of the reference payload.

When the size of the received payload is equal to that of the reference payload (or when the size of the received payload is within a predetermined range of the size of the reference payload), the received payload may be processed by the data processing circuit 320, in operation S430. On the other hand, when the size of the received payload is different from that of the reference payload (or when the size of the reception payload is beyond the predetermined range of the size of the reference payload), the second detection circuit 319 generates an activated second detection signal DET2.

The activated second detection signal DET2 is transmitted to the interrupt generation circuit 312. The interrupt generation circuit 312 transmits an interrupt INT corresponding to the activated second detection signal DET2 to the interrupt detector 215 of the host 200 via the exclusive line 301, in operation S440. The interrupt detector 215 transmits a signal corresponding to the interrupt INT to the CPU 205 via the bus 201.

The CPU 205 may interpret the signal received from the interrupt detector 215, and may determine that the MIPI interface 220 and/or the timing controller 300 are abnormal, according to a result of the interpretation. In other words, based on the signal, the CPU 205 may determine that external noise has flowed into the MIPI interface 220 and/or the timing controller 300.

The conventional host cannot receive feedback from the timing controller 300 regarding the determination that the MIPI interface 220 and/or the timing controller 300 are abnormal. However, the host 200 according to an exemplary embodiment of the present general inventive concept may receive feedback from the timing controller 300 regarding normality or abnormality of the MIPI interface 220 and/or the timing controller 300, via the interrupt INT. Thus, the host 200 may re-transmit frame information and/or a payload to the timing controller 300 via the MIPI interface 220.

The data processing circuit 320 may write the data output by the MIPI RX 310 to a frame memory 323, or may read the data written to the frame memory 323. According to embodiments, the data may be, for example, still image data, moving image data, or a video stream.

The data processing circuit 320 includes a write controller 321, the frame memory 323, a read controller 325, and a cyclic redundancy check (CRC) circuit 327. The write controller 321 may write the data output by the MIPI RX 310 to the frame memory 323. The read controller 325 may read the data written to the frame memory 323, and may transmit the read data to the processing circuit 340. According to embodiments, the write controller 321 and the read controller 325 may be integrally formed into a controller.

Figure 8:
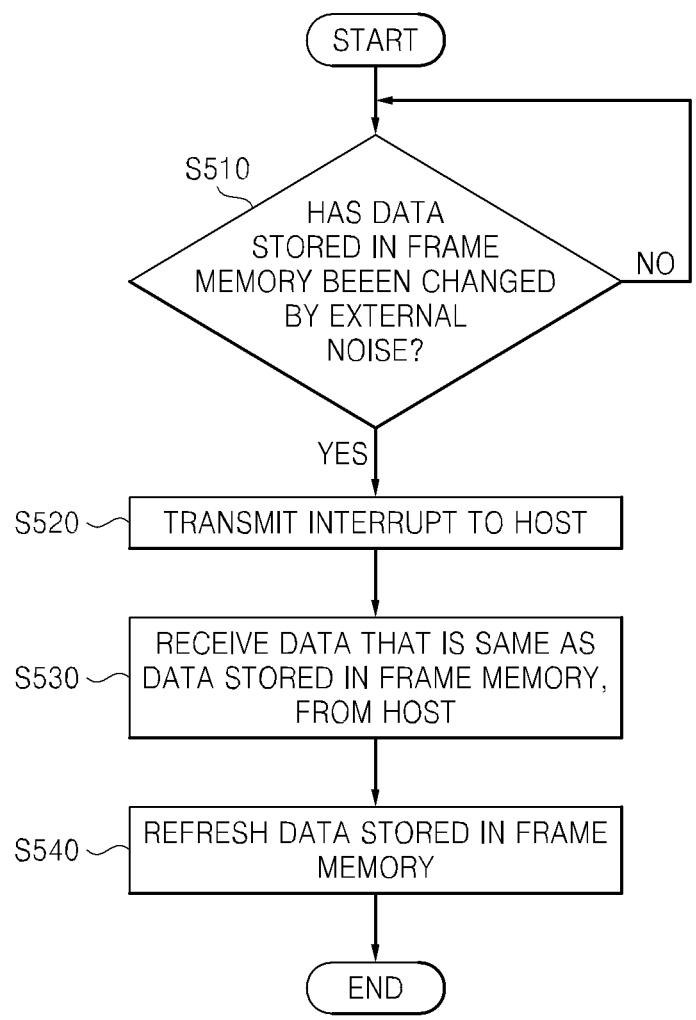
FIG. 8 is a flowchart illustrating a method of reinforcing a reliability of data stored in a frame memory of the timing controller illustrated in FIG. 2, according to an exemplary embodiment of the present general inventive concept.

FIG. 8 illustrates a flowchart of a method of reinforcing a reliability of data stored in the frame memory 323 of the timing controller 300 illustrated in FIG. 2, according to an exemplary embodiment of the present general inventive concept. The CRC circuit 327 may be referred to as a CRC checker.

The CRC circuit 327 may perform a CRC on the data (for example, still image data, moving image data, or a video stream) stored in the frame memory 323, and may generate an error detection signal DET3 according to a result of the CRC.

The CRC circuit 327 may determine via the CRC whether the data stored in the frame memory 323 has been changed by external noise, in operation S510. When it is determined in operation S510 that the data has not been changed, the CRC circuit 327 may periodically perform the operation S510.

When the timing controller 300 supports a panel self-refresh (PSR), the CRC circuit 327 may calculate a CRC with respect to new data (for example, still image data) input to the frame memory 323. The calculated CRC may be updated in synchronization with a read operation with respect to the frame memory 323.

When it is determined via the CRC in operation S510 that the data stored in the frame memory 323 has been changed, the CRC circuit 327 may generate an activated error detection signal DET3 and may transmit the activated error detection signal DET3 to the interrupt generation circuit 312.

The interrupt generation circuit 312 may transmit an interrupt INT corresponding to the activated error detection signal DET3 to the interrupt detector 215 of the host 200 via the exclusive line 301 (operation S520). The interrupt detector 215 transmits a signal corresponding to the interrupt INT to the CPU 205 via the bus 201.

The CPU 205 may interpret the signal received from the interrupt detector 215, and may determine that the MIPI interface 220 and/or the timing controller 300 are abnormal according to a result of the interpretation. In other words, based on the signal, the CPU 205 may determine that external noise has flowed into the MIPI interface 220 and/or the frame memory 323 of the timing controller 300.

The conventional host cannot receive feedback from the timing controller 300 regarding whether the MIPI interface 220 and/or the frame memory 323 of the timing controller 300 have been affected by noise. However, the host 200 according to an exemplary embodiment of the present general inventive concept can receive feedback from the timing controller 300 regarding whether the MIPI interface 220 and/or the frame memory 323 of the timing controller 300 has been affected by external noise, via the interrupt INT. Thus, the host 200 may re-transmit original data that is the same as data not affected by external noise, to the timing controller 300 via the MIPI interface 220 (operation S530).

The data processing circuit 321 may write the original data to the frame memory 323. Thus, the data stored in the frame memory 323 may be refreshed (operation S540). For example, the frame memory 323 may be implemented by using embedded dynamic random access memory (eDRAM). As the original data is re-written to the frame memory 323, a visual artifact generated on the display 400 may be removed.

Figure 9:
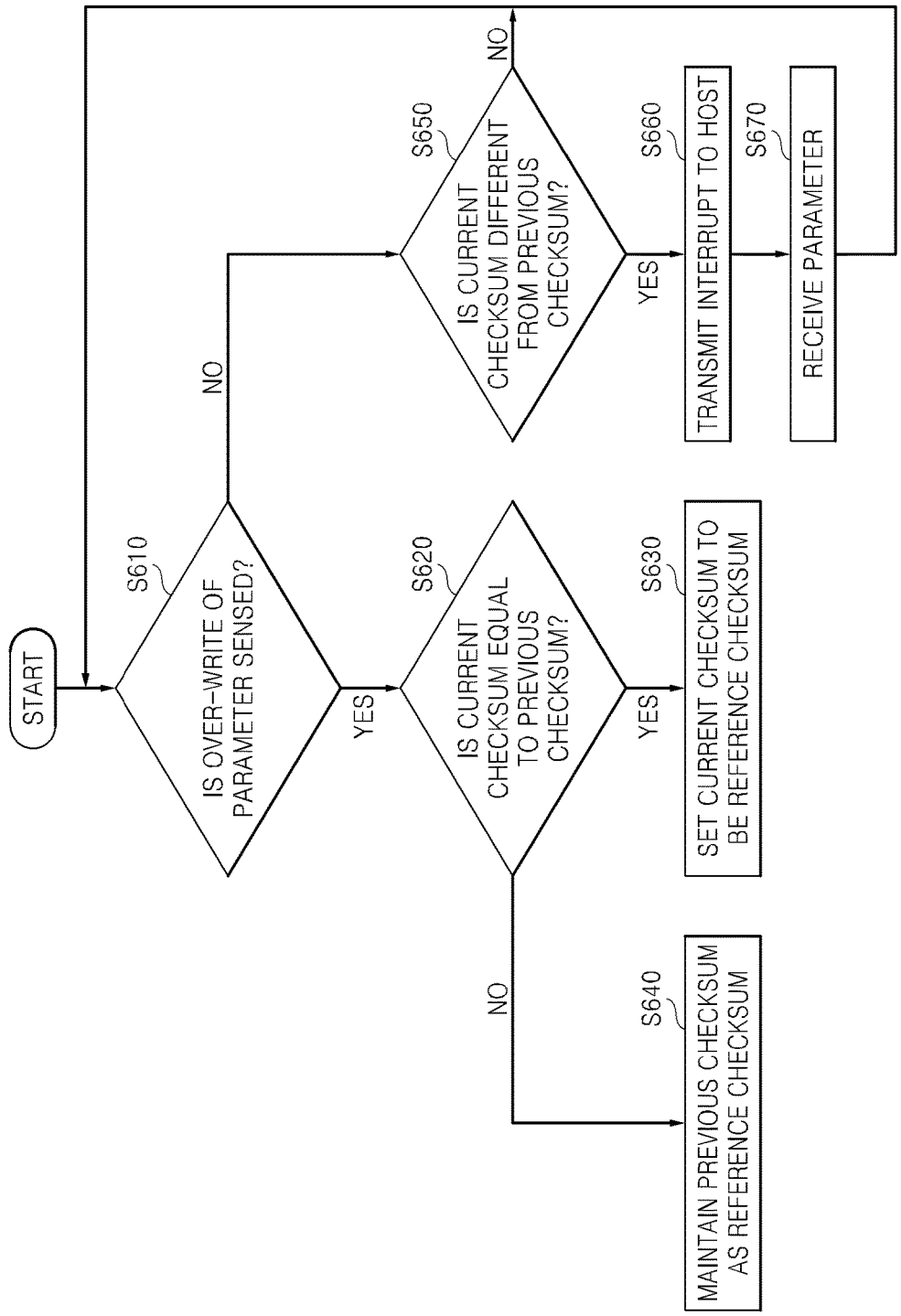
FIG. 9 is a flowchart illustrating a method of reinforcing a reliability of a parameter stored in a register bank included in the timing controller illustrated in FIG. 2, according to an exemplary embodiment of the present general inventive concept.

FIG. 9 illustrates a flowchart of a method of reinforcing a reliability of a parameter stored in the register bank 330 illustrated in FIG. 2, according to an exemplary embodiment of the present general inventive concept. Referring to FIGS. 1, 2, and 9, the register bank 330 may store one or more parameters used for an operation of the timing controller 300. According an exemplary embodiment, the register bank 330 may be implemented by using a special function register (SFR) or a special purpose register (SPR).

The parameter(s) may include any of various information, such as, for example, information about a frame rate of data which is to be processed by the timing controller 300, information about setting of a clock generator (for example, a PLL) implemented in the timing controller 300, and/or information about a resolution of the display panel 401.

When the parameter stored in the register bank 330 is changed by external noise, the timing controller 300 may not perform a normal operation according to the importance of the parameter.

The checksum circuit 335 may periodically scan (or read) the parameter(s) stored in the register bank 330, and may compare a first checksum currently calculated for the parameter(s) with a second checksum previously calculated for the parameter(s). In other words, after the parameter(s) stored in the register bank 330 is updated by the host 200, namely, after it is determined in operation S610 that an over-write with respect to the parameter(s) is sensed, the checksum circuit 335 calculates a first checksum for an updated current parameter(s) and compares the calculated first checksum with a second checksum calculated for a previous parameter (s), in operation S620.

When it is determined in operation S620 that the first checksum is different from the second checksum, the checksum circuit 335 may set the first checksum to be a reference checksum, in operation S630. When it is determined in operation S620 that the first checksum is the same as the second checksum, the checksum circuit 335 may maintain the second checksum, namely, a previous checksum, as the reference checksum, in operation S640.

On the other hand, when it is determined in operation S610 that the parameter(s) stored in the register bank 330 is not updated by the host 200, namely, an over-write with respect to the parameter(s) is not sensed, and it is determined in operation S650 that a first checksum for the not-updated parameter(s) is different from a second checksum previously calculated for the not-updated parameter(s), the checksum circuit 335 outputs an activated error detection signal DET4.

The interrupt generation circuit 312 transmits an interrupt INT corresponding to the activated error detection signal DET4 to the interrupt detector 215 of the host 200 via the exclusive line 301, in operation S660. The interrupt detector 215 transmits a signal corresponding to the activated interrupt INT to the CPU 205 via the bus 201.

The CPU 205 may interpret the signal received from the interrupt detector 215, and may determine that the parameter (s) stored in the register bank 330 has been changed by external noise according to a result of the interpretation.

The conventional host cannot receive feedback from the timing controller 300 regarding whether the parameter(s) stored in the register bank 330 has been affected by external noise. However, the host 200 according to an exemplary embodiment of the present general inventive concept can receive feedback from the timing controller 300 regarding whether the parameter(s) stored in the register bank 330 has been affected by external noise, via an interrupt INT. Thus, the host 200 may re-transmit an original parameter(s) that is the same as the parameter(s) stored in the register bank 330 and not affected by external noise to the timing controller 300 via the MIPI interface 220.

The data processing circuit 321 may receive the original parameter(s) and may write the received original parameter (s) to the register bank 330, in operation S670.

The processing circuit 340 may process the data output by the data processing circuit 320, and may transmit the processed data to the line memory 345. The processing circuit 340 may control an operation of the line memory 345 in response to the activated event signal DETP output by the display 400 and received via the exclusive (or dedicated) line 361.

The display controller 350 may transmit line data (for example, display data) that is received from the line memory 345 in units of lines, to the reception interface 410 of the display 400 via the display interface 360.

Figure 10:
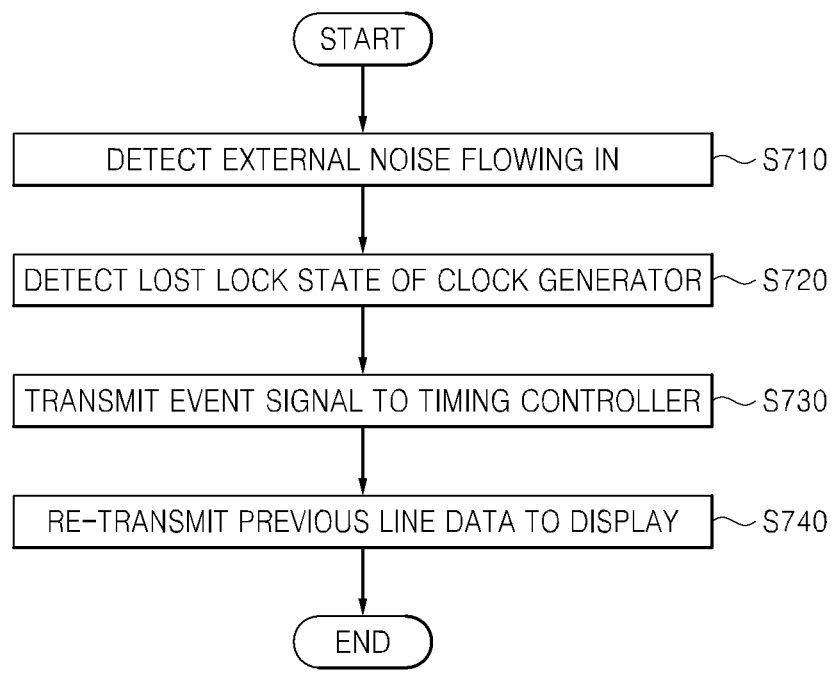
FIG. 10 is a flowchart illustrating a method of reinforcing a reliability of a display interface illustrated in FIG. 1, according to an exemplary embodiment of the present general inventive concept.
Figure 11:
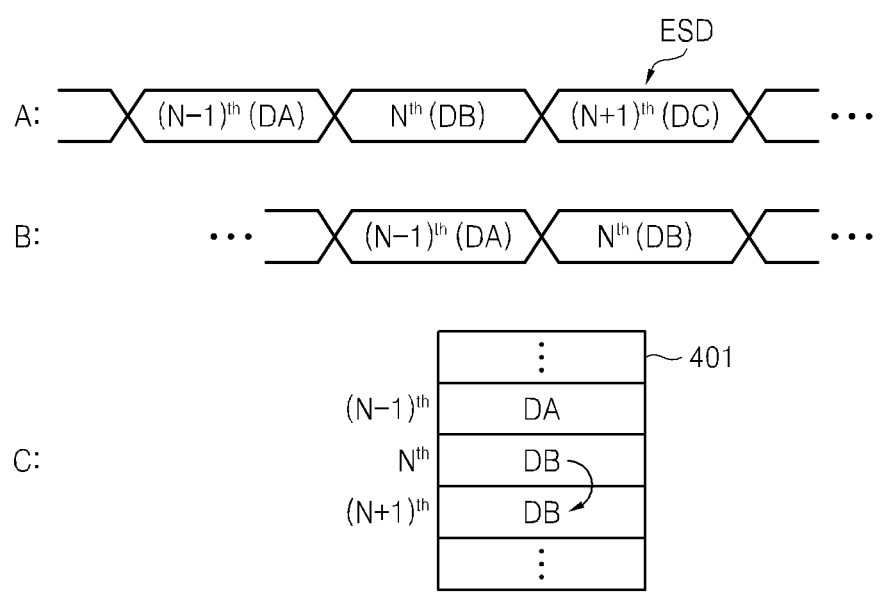
FIG. 11 is a diagram illustrating the method illustrated in FIG. 10, according to an exemplary embodiment of the present general inventive concept.

FIG. 10 illustrates a flowchart of a method of reinforcing a reliability of the display interface 360 illustrated in FIG. 1, according to an exemplary embodiment of the present general inventive concept. FIG. 11 is a conceptual diagram of the method illustrated in FIG. 10. Referring to FIGS. 1, 2, 10, and 11, when the clock generator 420 loses a lock state due to the influence of external noise while display data is being transmitted to the display 400 via the display interface 360, a visual artifact may occur on the display panel 401.

For example, as illustrated in line (A) of FIG. 11, line data DA and DB may be normally transmitted for the (N−1)th line and Nth line, respectively. The data DA and DB are correspondingly received by the display panel 401, as illustrated in line (B), and displayed on the display panel 401, as illustrated at line (C). However, when an external noise (for example, ESD) is detected to have flowed into the clock generator 420 in operation S710 while (N+1)th line data DC is being transmitted from the line memory 345 to the display panel 401 via the components 350, 360, and 410, the clock generator 420 may lose a lock state.

The detector 430 may detect the loss of the lock state of the clock generator 420 (operation S720), and may transmit the activated event signal DETP to the processing circuit 340 of the timing controller 300 via the exclusive line 361 (operation S730). Herein, an activated signal denotes a signal having one of a low level and a high level.

The processing circuit 340 may re-transmit previous line data, namely, N-th line data DB, to the display panel 401 via the components 350, 360, and 410, based on the activated event signal DETP (operation S740). The N-th line data DB is displayed in each of an N-th line and an (N+1)th line. However, a visual artifact may be decreased on the display panel 401 by the N-th line data DB.

An MIPI-based timing controller according to an embodiment of the inventive concept may transmit information about whether an MIPI interface is normal and information about whether the timing controller is normal, to a host.

Accordingly, the host may control the operation of the timing controller based on the information. A display controlled by the timing controller may transmit information about a loss of the lock state of a clock generator included in the display, to the timing controller. Thus, the timing controller may perform an operation of controlling a visual artifact that is generated on the display.

While a few embodiments of the present general inventive concept have been particularly shown and described, it will be appreciated by those of ordinary skill in the art that various changes in forms and details may be made in these embodiments without departing from the spirit and principles of the general inventive concept, the scope of which is defined in the following claims and their equivalents.

What is claimed is:

1. A timing controller capable of communicating with a host via a Mobile Industry Processor Interface (MIPI) interface and communicating with a display via a display interface, the timing controller comprising:
a detection circuit that detects whether at least one of the MIPI interface and the timing controller is operating normally, and generates a detection signal;
an interrupt generation circuit that transmits the detection signal as an interrupt to the host via an exclusive line; and
a clock lane module,
wherein the detection circuit detects a transition of an operation mode of the timing controller from a low power (LP) mode to a high speed (HS) mode based on an output signal of the clock lane module, and outputs the detection signal, and the clock lane module maintains the HS mode in response to the detection signal even when the output signal of the clock lane module is changed by external noise in the HS mode.

2. The timing controller of claim 1, further comprising:
a data lane module including a finite state machine (FSM) capable of controlling a communication direction,
wherein the detection circuit detects a change of a direction indication signal output by the data lane module, and generates the detection signal according to a result of the detection, and the FSM is initialized so that the data lane module may operate in a reception mode in response to the detection signal.

3. The timing controller of claim 1, further comprising:
a reception interface that transforms MIPI data received via the MIPI interface from the host into display data,
wherein the detection circuit generates the detection signal when frame information included in the display data output by the reception interface is not received within a predetermined period of time.

4. timing controller of claim 1, further comprising:
a reception interface that transforms MIPI data received via the MIPI interface from the host into display data,
wherein the detection circuit generates the detection signal when a size of a payload included in the display data output by the reception interface is different from that of a reference payload.

5. The timing controller of claim 1, further comprising:
a frame memory that stores data; and
a cyclic redundancy check (CRC) circuit that generates an error detection signal based on a CRC with respect to the data,
wherein the interrupt generation circuit generates the interrupt based on the error detection signal.

6. The timing controller of claim 1, further comprising:
a register bank that stores a parameter used for an operation of the timing controller; and
a checksum circuit that sets a first checksum for an updated parameter into a reference checksum when the parameter as stored is updated into the updated parameter by the host and a first checksum for the updated parameter is different from a second checksum for the parameter as stored.

7. The timing controller of claim 1, further comprising:
a register bank that stores a parameter used for an operation of the timing controller; and
a checksum circuit that outputs an error detection signal when the parameter as stored is not updated by the host and a first checksum for the parameter as stored is different from a second checksum that is previously calculated for the parameter as stored,
wherein the interrupt generation circuit generates the interrupt based on the error detection signal.

8. The timing controller of claim 7, wherein the parameter as stored comprises at least one of frame rate information, resolution information, or setting information of a clock generator implemented in the timing controller.

9. The timing controller of claim 1, further comprising:
a processing circuit that receives an event signal from the display while transmitting (N+1)th line data to the display via the display interface; and
a line memory that re-transmits N-th line data to the display via the display interface under control of the processing circuit.

10. The timing controller of claim 1, wherein:
the clock lane module includes a terminal resistor and a finite state machine (FSM),
the detection circuit controls the terminal resistor of the clock lane module and the FSM of the clock lane module based on a result of the detection of the transition, and
the clock lane module maintains the HS mode according to the control by the detection circuit.

11. A display system comprising:
a host;
a timing controller that communicates with the host via a Mobile Industry Processor Interface (MIPI) interface; and
a display that communicates with the timing controller via a display interface,
wherein the timing controller comprises:
a detection circuit that detects whether at least one of the MIPI interface and the timing controller is operating normally, and generates a detection signal; and
an interrupt generation circuit that transmits the detection signal as an interrupt to the host via an exclusive line,
wherein the timing controller further comprises a clock lane module, the detection circuit detects a transition of an operation mode of the timing controller from a low power (LP) mode to a high speed (HS) mode based on an output signal of the clock lane module, and outputs the detection signal, and the clock lane module maintains the HS mode in response to the detection signal even when the output signal of the clock lane module is changed by external noise in the HS mode.

12. The display system of claim 11, wherein the timing controller further comprises a data lane module including a finite state machine (FSM) capable of controlling a communication direction, the detection circuit detects a change of direction indication signal output by the data lane module, and generates the detection signal according to a result of the detection, and the FSM is initialized so that the data lane module may operate in a reception mode in response to the detection signal.

13. The display system of claim 11, wherein the timing controller further comprises a reception interface that transforms MIPI data received via the MIPI interface from the host into display data, and the detection circuit generates the detection signal when frame information included in the display data output by the reception interface is not received within a predetermined period of time.

14. The display system of claim 11, wherein the timing controller further comprises a reception interface that transforms MIPI data received via the MIPI interface from the host into display data, and the detection circuit generates the detection signal when a size of a payload included in the display data output by the reception interface is different from that of a reference payload.

15. The display system of claim 11, wherein the timing controller further comprises:

a frame memory that stores data; and a CRC circuit that generates an error detection signal based on a CRC with respect to the data, the interrupt generation circuit generates the interrupt based on the error detection signal, and the host refreshes the data stored in the frame memory and transmits original data to the timing controller.

16. The display system of claim 11, wherein the timing controller further comprises:

a register bank that stores a parameter used for an operation of the timing controller; and a checksum circuit that sets a first checksum for an updated parameter into a reference checksum when the parameter as stored is updated into the updated parameter by the host and the first checksum for the updated parameter is different from a second checksum for the parameter as stored, and the updated parameter is output by the host.

17. The display system of claim 11, wherein the timing controller further comprises:

a register bank that stores a parameter used for an operation of the timing controller; and a checksum circuit that outputs an error detection signal when the parameter as stored is not updated by the host and a first checksum for the parameter as stored is different from a second checksum that is previously calculated for the parameter as stored, and the interrupt generation circuit generates the interrupt based on the error detection signal.

18. The display system of claim 11, wherein the timing controller further comprises:

a processing circuit that receives an event signal from the display while in processing of transmitting (N+1)th line data to the display via the display interface; and a line memory that re-transmits N-th line data to the display via the display interface under control of the processing circuit.

19. The display system of claim 18, wherein the display comprises:

a clock generator that generates a display clock; and a detector that detects a loss of a lock state of the clock generator and generates the event signal according to a result of the detection.

20. The display system of claim 11, wherein:

the clock lane module includes a terminal resistor and a finite state machine (FSM), the detection circuit controls the terminal resistor of the clock lane module and the FSM of the clock lane module based on a result of the detection of the transition, and the clock lane module maintains the HS mode according to the control by the detection circuit.

* * * * *